(12) United States Patent
Yasutomi et al.

(10) Patent No.: US 9,214,814 B2
(45) Date of Patent: Dec. 15, 2015

(54) SECONDARY BATTERY SYSTEM

(75) Inventors: Sei Yasutomi, Tokyo (JP); Matsuo Bando, Tokyo (JP); Tomio Tamakoshi, Nagoya (JP)

(73) Assignee: JAPAN WIND DEVELOPMENT CORPORATION LTD., Tokyo (JP)

( * ) Notice: Subject to any disclaimer, the term of this patent is extended or adjusted under 35 U.S.C. 154(b) by 695 days.

(21) Appl. No.: 13/109,766

(22) Filed: May 17, 2011

(65) Prior Publication Data

US 2011/0278930 A1 Nov. 17, 2011

Related U.S. Application Data

(63) Continuation of application No. PCT/JP2008/071040, filed on Nov. 19, 2008.

(51) Int. Cl.
| | | |
|---|---|---|
| *H02J 9/00* | (2006.01) | |
| *H02J 3/32* | (2006.01) | |
| *H02J 3/38* | (2006.01) | |

(52) U.S. Cl.
CPC ... *H02J 3/32* (2013.01); *H02J 3/38* (2013.01); *Y10T 307/62* (2015.04)

(58) Field of Classification Search
USPC ............. 307/9.1, 10.1, 65–66, 80–82, 85–87; 320/124, 118, 127, 116, 119, 122
See application file for complete search history.

(56) References Cited

U.S. PATENT DOCUMENTS

| | | | |
|---|---|---|---|
| 5,652,499 A | 7/1997 | Morita et al. | |
| 6,111,764 A * | 8/2000 | Atou et al. | 363/37 |
| 6,259,017 B1 * | 7/2001 | Takehara et al. | 307/82 |
| 7,081,737 B2 * | 7/2006 | Liu et al. | 320/130 |
| 7,710,073 B2 | 5/2010 | Yamauchi et al. | |
| 7,714,543 B2 * | 5/2010 | Yoshida | 320/134 |
| 7,804,195 B2 * | 9/2010 | Hung et al. | 307/66 |
| 7,965,069 B2 * | 6/2011 | Watanabe et al. | 323/284 |
| 8,299,757 B2 | 10/2012 | Yamauchi et al. | |

(Continued)

FOREIGN PATENT DOCUMENTS

| | | |
|---|---|---|
| CN | 1135113 A | 11/1996 |
| CN | 1476141 A | 2/2004 |

(Continued)

OTHER PUBLICATIONS

Nakabayashi, et al.: "The January Issue of Monthly Energy", The Nikkan Kogyo Shimbun, Ltd.; Dec. 28, 2004; pp. 82-84.

(Continued)

*Primary Examiner* — Rexford Barnie
*Assistant Examiner* — Daniel Kessie
(74) *Attorney, Agent, or Firm* — Holtz, Holtz, Goodman & Chick PC

(57) ABSTRACT

There is provided a secondary battery system which converts direct current power supplied from secondary batteries into alternating current power by power converters, and supplies the converted power to an electric power system on a load side, the secondary battery system including a control apparatus that stops operating the operating the power converter and starts operating the stopped the power converter when a residual stored power level of the secondary battery corresponding to operating the power converter becomes to be not greater than a predetermined rate of a residual stored power level of the secondary battery corresponding to stopped the power converter.

3 Claims, 5 Drawing Sheets

(56) References Cited

U.S. PATENT DOCUMENTS

| | | | |
|---|---|---|---|
| 8,571,734 B2* | 10/2013 | Yamamoto et al. | 701/22 |
| 8,648,568 B2* | 2/2014 | McCollum et al. | 320/116 |
| 2001/0013767 A1 | 8/2001 | Takemoto | |
| 2001/0043013 A1 | 11/2001 | Abe | |
| 2003/0167415 A1 | 9/2003 | Odaohhara et al. | |
| 2005/0242781 A1 | 11/2005 | Nakagawa | |
| 2011/0115435 A1* | 5/2011 | Kikuchi | 320/118 |
| 2011/0227534 A1* | 9/2011 | Mitsutani | 320/109 |
| 2012/0013182 A1* | 1/2012 | Minegishi et al. | 307/9.1 |
| 2013/0018610 A1 | 1/2013 | Yamauchi et al. | |

FOREIGN PATENT DOCUMENTS

| | | |
|---|---|---|
| EP | 1 156 573 A2 | 11/2001 |
| EP | 1 517 021 A1 | 3/2005 |
| JP | 8-140285 | 5/1996 |
| JP | 9-46914 | 2/1997 |
| JP | 11-252812 | 9/1999 |
| JP | 2000-116014 | 4/2000 |
| JP | 2001-103740 A | 4/2001 |
| JP | 2001-327083 | 11/2001 |
| JP | 2003-256083 | 9/2003 |
| KR | 1020070051712 A | 5/2007 |
| WO | 2010050040 A1 | 5/2010 |

OTHER PUBLICATIONS

International Preliminary Report on Patentability (IPRP) dated Jun. 30, 2011 (in English) issued in parent International Application No. PCT/JP2008/071040.

Chinese Office Action dated Mar. 6, 2013 (and English translation thereof) in counterpart Chinese Application No. 200880132071.X.

International Search Report from Japanese Patent Office for International Application No. PCT/JP2008/071040, Mailed Jan. 27, 2009.

Korean Office Action dated May 9, 2014 in counterpart Korean Application No. 10-2011-7011428.

Extended European Search Report (EESR) dated Dec. 16, 2013 (in English) in counterpart European Application No. 08878257.8.

Australian Office Action dated Jul. 7, 2014 in counterpart Australian Application No. 2008364377.

* cited by examiner

SECONDARY BATTERY SYSTEM

CROSS REFERENCE TO RELATED APPLICATIONS

This is a Continuation application of PCT Application No. PCT/JP2008/071040, filed Nov. 19, 2008, which was published under PCT Article 21(2) in Japanese, the entire contents of which are incorporated herein by reference.

BACKGROUND OF THE INVENTION

1. Field of the Invention

The present invention relates to a secondary battery system using a secondary battery.

2. Description of the Related Art

There is a conventionally known secondary battery system which supplies electric power by using a secondary battery. Such a secondary battery system is used, for example, to compensate for electric power at power receiving points (for example, see "The January issue of Monthly Energy", The Nikkan Kogyo Shimbun, Ltd., Dec. 28, 2004, pp. 82 to 84).

However, when electric power is supplied by using a plurality of secondary batteries, operation of a secondary battery system need be limited depending on residual power levels of individuals of the secondary batteries, in some cases.

Therefore, the secondary battery system sometimes cannot efficiently be operated due to the residual power of the individual secondary batteries.

BRIEF SUMMARY OF THE INVENTION

An object of the invention is to provide a secondary battery system capable of efficiently operating a secondary battery system using a plurality of secondary batteries.

According to an aspect of the present invention, there is provided a secondary battery system comprising: two or more secondary batteries; two or more power conversion units, which are provided respectively corresponding to the two or more secondary batteries, convert electric power supplied respectively from corresponding one of the two or more secondary batteries; a detection unit which detects that a residual stored power level of the secondary battery corresponding to one of the power conversion units operating becomes to be not greater than a predetermined rate of a residual stored power level of the secondary battery corresponding to stopped the power conversion units; and a operation switch unit which stops operation of the power conversion unit corresponding to the secondary battery whose residual stored power level is a target to be detected by the detection unit, and starts operation of the stopped the power conversion unit.

DETAILED DESCRIPTION OF THE INVENTION

Hereinafter, embodiments of the invention will be described with reference to the drawings.

(First Embodiment)

Figure 1:
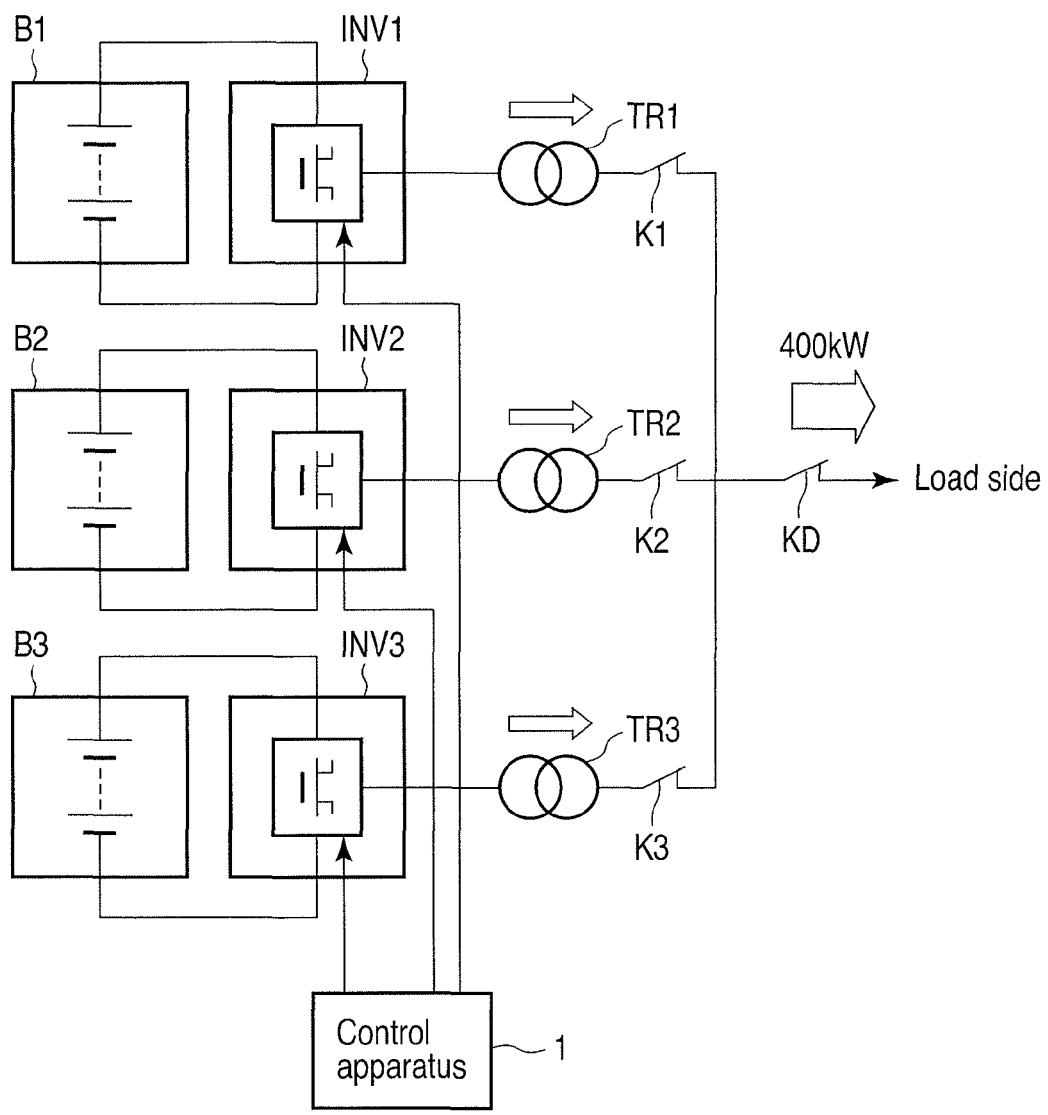
FIG. 1 is a block diagram showing a configuration of a secondary battery system according to the first embodiment of the invention.

FIG. 1 is a block diagram showing a configuration of a secondary battery system according to the first embodiment of the invention. Parts which are common to figures cited below are respectively denoted at common reference symbols. Reiterative detailed descriptions thereof will be omitted, and descriptions will be mainly made of different parts between the figures. Reiterative descriptions to later embodiments will be omitted as well.

The secondary battery system includes secondary batteries B1, B2, and B3, power converters INV1, INV2, and INV3 connected respectively to secondary batteries B1, B2, and B3, transformers TR1, TR2, and TR3 connected respectively to the output sides of power converters INV1, INV2, and INV3, circuit breakers K1, K2, and K3 connected respectively to transformers TR1, TR2, and TR3, a circuit breaker KD connected so as to short-circuit the output sides of circuit breakers K1, K2, and K3 and provided between a connection point of the short-circuits and a load side supplied with electric power, and a control apparatus 1 which controls three power converters INV1, INV2, and INV3. Secondary batteries B1, B2, and B3 are, for example, sodium-sulfur batteries (NAS batteries).

Secondary batteries B1, B2, and B3 supply charged electric power as direct current power to power converters INV1, INV2, and INV3 connected to the secondary batteries, respectively.

Power converters INV1, INV2, and INV3 respectively convert the direct current power supplied from secondary batteries B1, B2, and B3 into alternating current power, based on instructions from the control apparatus 1. Power converters INV1, INV2, and INV3 output the converted alternating current power to transformers TR1, TR2, and TR3 connected to the power converters, respectively.

Transformer TR1 supplies the alternating current power from power converter INV1 to an electric power system on a load side sequentially through circuit breaker K1 and circuit breaker KD.

Transformer TR2 supplies the alternating current power from power converter INV2 to the electric power system on the load side sequentially through circuit breaker K2 and circuit breaker KD.

Transformer TR3 supplies the alternating current power from power converter INV3 to the electric power system on the load side sequentially through circuit breaker K3 and circuit breaker KD.

Circuit breakers K1, K2, and K3 stop, by opening themselves, supply of the alternating current power output from power converters INV1, INV2, and INV3, respectively, to load side.

Circuit breaker KD stops supply of electric power from the present secondary battery system by opening itself.

Based on residual stored power levels of secondary batteries B1, B2, and B3, the control apparatus 1 controls power converters INV1, INV2, and INV3. A setting value for switching operations of power converters INV1, INV2, and INV3 is set in the control apparatus 1. Based on the setting value and the residual stored power levels of secondary batteries B1, B2, and B3, the control apparatus 1 switches operations of power converters INV1, INV2, and INV3.

Next, control of the control apparatus 1 will be described with reference to FIGS. 2A, 2B, 2C, 2D, 2E, 2F, and 2G.

FIGS. 2A, 2B, 2C, 2D, 2E, 2F, and 2G are graphs showing transitions of output power of power converters INV1, INV2, and INV3 and residual stored power levels of secondary batteries B1, B2, and B3 under control of the control apparatus 1 in the secondary battery system according to the first embodiment of the invention.

Figure 2A:
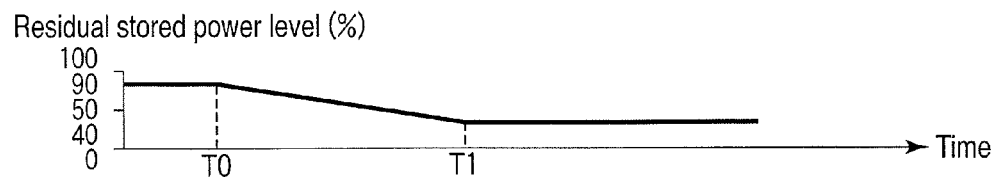
FIG. 2A is a graph showing a transition of a residual stored power level of a first secondary battery in the secondary battery system according to the first embodiment of the invention.
Figure 2B:
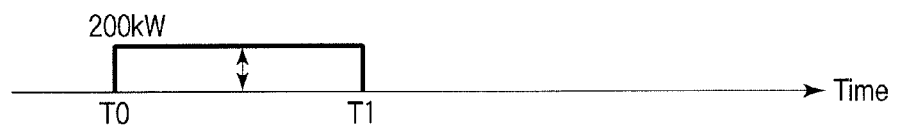
FIG. 2B is a graph showing a transition of output power of a first power converter in the secondary battery system according to the first embodiment of the invention.
Figure 2C:
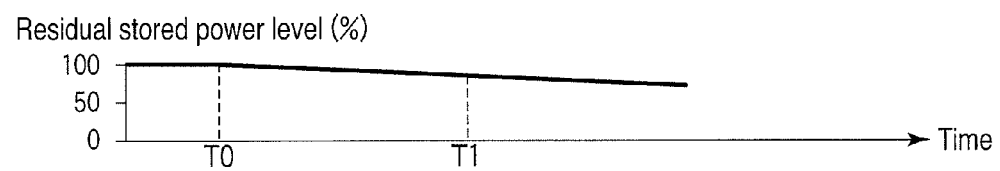
FIG. 2C is a graph showing a transition of a residual stored power level of a second secondary battery in the secondary battery system according to the first embodiment of the invention.
Figure 2D:
FIG. 2D is a graph showing a transition of output power of a second power converter in the secondary battery system according to the first embodiment of the invention.
Figure 2E:
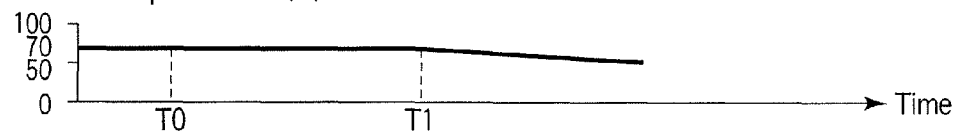
FIG. 2E is a graph Showing a transition of a residual stored power level of a third secondary battery in the secondary battery system according to the first embodiment of the invention.
Figure 2F:
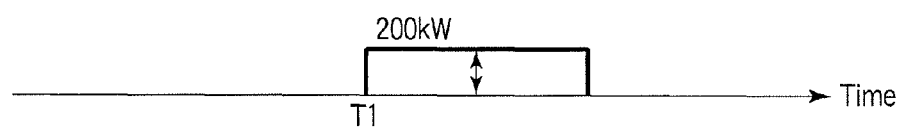
FIG. 2F is a graph showing a transition of output power of a third power converter in the secondary battery system according to the first embodiment of the invention.
Figure 2G:
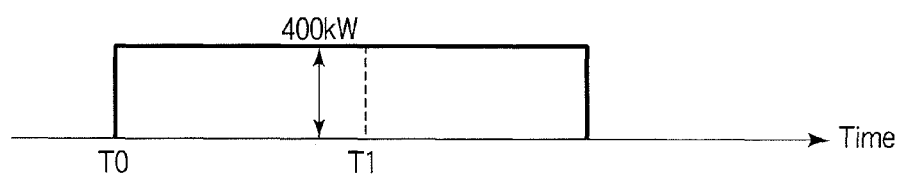
FIG. 2G is a graph showing a transition of output power of the secondary battery system according to the first embodiment of the invention.

FIG. 2A is a graph showing a transition of the residual stored power level of secondary battery B1. FIG. 2B is a graph showing a transition of the output power of power converter INV1. FIG. 2C is a graph showing a transition of the residual stored power level of secondary battery B2. FIG. 2D is a graph showing a transition of the output power of power converter INV2. FIG. 2E is a graph showing a transition of the residual stored power level of secondary battery B3. FIG. 2F is a graph showing a transition of the output power of power converter INV3. FIG. 2G is a graph showing a transition of output power of the secondary battery system.

Now, the secondary battery system is supposed to be required to supply electric power of 400 kW to the electric power system on the load side. Power converters INV1, INV2, and INV3 each are supposed to be capable of maximum power generation of 200 kW. A setting value of 70% is supposed to be set in the control apparatus 1 to switch power converters INV1, INV2, and INV3.

The control apparatus 1 is supposed to start control at a time point T0.

Power of 400 kW is required for the secondary battery system to supply to the electric power system on the load side. Each of power converters INV1, INV2, and INV3 is capable of maximum power generation of 200 kW. Power can be supplied by operating two power converters. Hence, the control apparatus 1 supplies power by two power converters, and stops the remaining one power converter.

At time point T0, secondary batteries B1, B2, and B3 respectively have residual stored power levels as follows. The residual stored power level of secondary battery B1 is 90%. The residual stored power level of secondary battery B2 is 100%. The residual stored power level of secondary battery B3 is 70%.

Therefore, the control apparatus 1 operates power converters INV1 and INV2 connected to the two secondary batteries B1 and B2 in order from the greatest residual stored power level. The control apparatus 1 stops power converter INV3 connected to secondary battery B3 having the smallest residual stored power level.

The control apparatus 1 operates power converters INV1 and INV2 from time point T0 to a time point T1.

At time point T1, the residual stored power level of secondary battery B1 connected to power converter INV1 reaches approximately 49%. The 49% is an equivalent value to 70% as the setting value which is set in the control apparatus 1 for the residual stored power level of secondary battery B3 connected to the stopped power converter INV3.

Therefore, the control apparatus 1 stops power converter INV1, and operates power converter INV3.

Specifically, switching of the power converters is performed when an inequality below is satisfied where A % is a residual stored power level of a secondary battery connected to a stopped power converter, B % is a setting value in the control apparatus 1, and C % is a residual stored power level of one of the secondary batteries connected to one of the operating power converters which has the smallest residual stored power level.

$$C\% < A\% \times B\%$$

When the foregoing inequality is satisfied, the control apparatus 1 stops operating one power converter connected to the secondary battery having the smallest residual stored power level, and starts operating a stopped power converter.

At time point T1 shown in FIGS. 2A, 2B, 2C, 2D, 2E, 2F, and 2G, the secondary battery having the smallest residual stored power level is secondary battery B1 connected to power converter INV1. Therefore, the control apparatus 1 stops operating power converter INV1, and starts operating power converter INV3.

The control apparatus 1 operates power converters INV1, INV2, and INV3 by repeating an operation process as described above.

According to the present embodiment, when power required for the electric power system on the load side can be supplied even with one power converter stopped, equipment as a whole can reduce loss equivalent to one power converter by stopping one power converter constantly.

The secondary battery system can supply electric power to the electric power system on the load side by operating the power converters so as to equalize residual stored power levels of all secondary batteries B1, B2, and B3. By maintaining the residual stored power levels to be uniform in this manner, operation and maintenance of the equipment in the secondary battery system can be facilitated.

(Second Embodiment)

Figure 3:
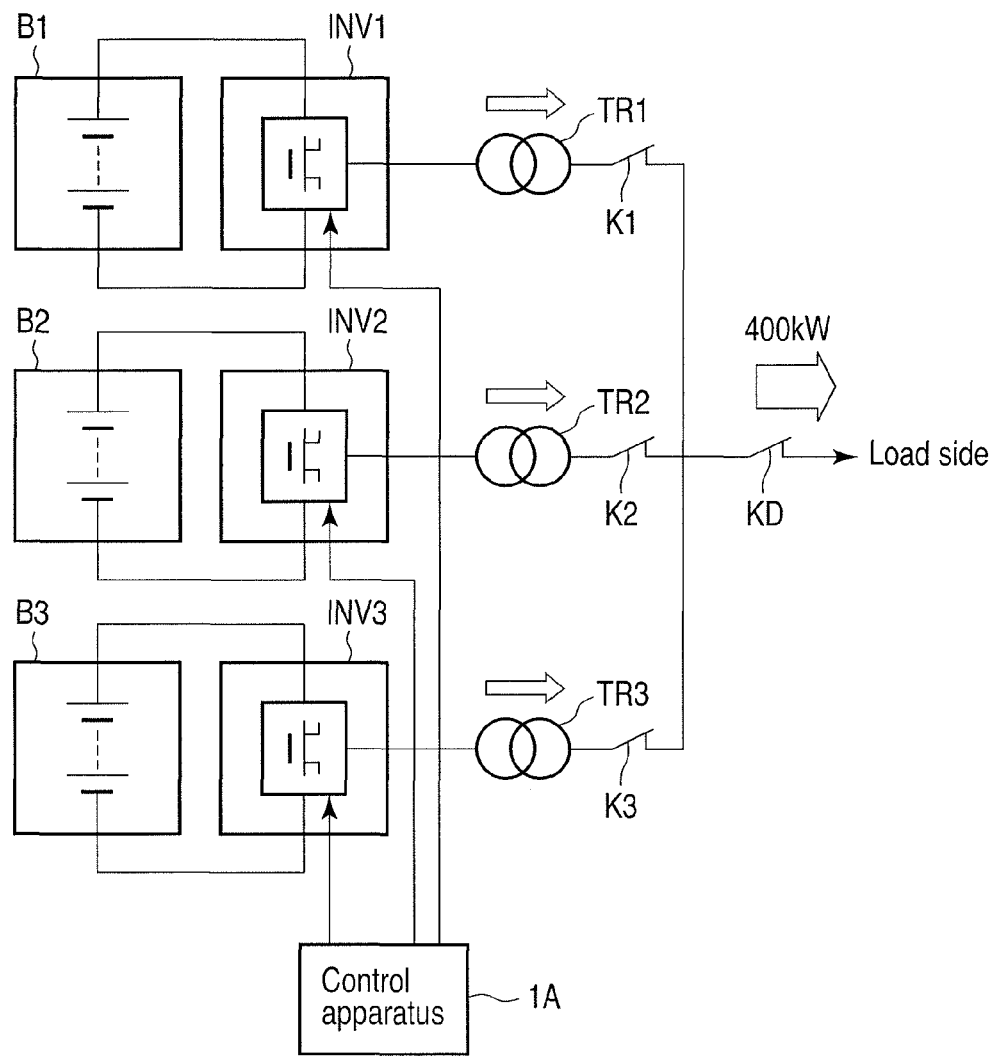
FIG. 3 is a block diagram showing a configuration of a secondary battery system according to the second embodiment of the invention.

FIG. 3 is a block diagram showing a configuration of a secondary battery system according to the second embodiment of the invention.

In the secondary battery system according to the present embodiment, the control apparatus 1 in the secondary battery system according to the first embodiment shown in FIG. 1 is substituted with a control apparatus 1A. The other features are configured in the same manner as in the secondary battery system according to the first embodiment.

The control apparatus 1A controls power converters INV1, INV2, and INV3. A setting value for switching operations of power converters INV1, INV2, and INV3 is set in the control apparatus 1A. Based on the setting value, the control apparatus 1A switches power converters INV1, INV2, and INV3.

Next, control of the control apparatus 1A will be described with reference to FIGS. 4A, 4B, 4C, and 4D.

FIGS. 4A, 4B, 4C, and 4D are graphs showing transitions of output power of power converters INV1, INV2, and INV3 under control of the control apparatus 1A in the secondary battery system according to the second embodiment of the invention.

Figure 4A:
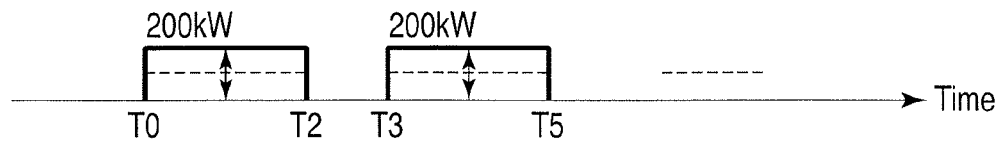
FIG. 4A is a graph showing a transition of output power of a first power converter in the secondary battery system according to the second embodiment of the invention.
Figure 4B:
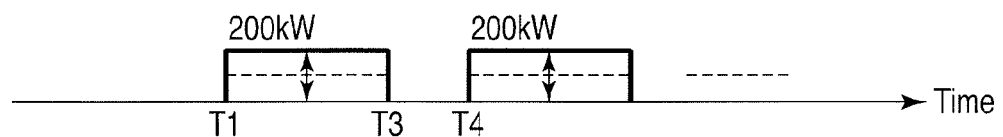
FIG. 4B is a graph showing a transition of output power of a second power converter in the secondary battery system according to the second embodiment of the invention.
Figure 4C:
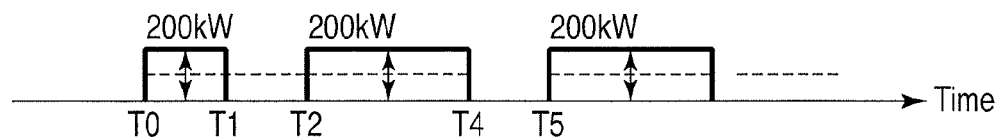
FIG. 4C is a graph showing a transition of output power of a third power converter in the secondary battery system according to the second embodiment of the invention.

FIG. 4A is a graph showing a transition of the output power of power converter INV1. FIG. 4B is a graph showing a transition of the output power of power converter INV2. FIG. 4C is a graph showing a transition of the output power of power converter INV3.

Figure 4D:
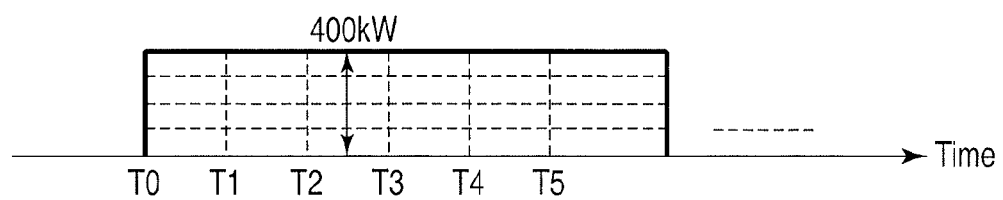
FIG. 4D is a graph showing a transition of output power of the secondary battery system according to the second embodiment of the invention.

FIG. 4D is a graph showing a transition of output power of the secondary battery system.

Now, the secondary battery system is now supposed to be required to supply electric power of 400 kW to the electric power system on the load side. Power converters INV1, INV2, and INV3 each are supposed to be capable of maximum power generation of 200 kW. Residual stored power levels of secondary batteries B1, B2, and B3 corresponding respectively to power converters INV1, INV2, and INV3 are supposed to be substantially uniform. A setting value which is set in the control apparatus 1A to switch operations of power converters INV1, INV2, and INV3 is supposed to be a time period T.

The control apparatus 1A is supposed to start control at a time point T0.

Power of 400 kW is required for the secondary battery system to supply to the electric power system on the load side. Each of power converters INV1, INV2, and INV3 is capable of maximum power generation of 200 kW. Power can be supplied by operating two power converters. Hence, the control apparatus 1A supplies power by two power converters, and stops the remaining one power converter.

The control apparatus 1A starts operation of the two power converters INV1 and INV3.

At a time point T1 when a time period T/2 which is half time period T as the setting value elapses from the start of the operation, the control apparatus 1A stops operating power converter INV3, and starts operating power converter INV2. In this manner, the control apparatus 1A switches one power converter to operate, from power converter INV3 to power converter INV2.

At a time point T2 when time period T/2 further elapses from time point T1, the control apparatus 1A stops operating power converter INV1, and starts operating power converter INV3. In this manner, the control apparatus 1A switches a power converter to operate, from power converter INV1 to power converter INV3.

Similarly, at each of time points T3, T4, and T5 when time period T/2 further elapses, the control apparatus 1A switches a power converter to operate among power converters INV1, INV2, and INV3. The control apparatus 1A operates power converters INV1, INV2, and INV3 by repeating such switching.

Under control of the control apparatus 1A as described above, power converters INV1, INV2, and INV3 each repeat a stop after continuous operation for time period T as the setting value.

According to the present embodiment, when power required for the electric power system on the load side can be supplied even with one power converter stopped, equipment as a whole can reduce loss equivalent to one power converter by stopping one power converter constantly.

Each time that time period T/2 set in the control apparatus 1A elapses, power converters INV1, INV2, and INV3 are switched to operate in turn. Therefore, all secondary batteries B1, B2, and B3 can be uniformly consumed. By maintaining the residual stored power levels of secondary batteries B1, B2, and B3 to be uniform in this manner, operation and maintenance of the equipment in the secondary batteries can be facilitated.

Although each of the embodiments employs three secondary batteries and three power converters, any number of secondary batteries as well as power converters can be employed insofar as the number is not smaller than two. In addition, although one power converter is stopped, two or more power converters may be stopped insofar as the electric power system on the load side can be supplied with a required power. In such a configuration, if two or more power converters stop operating and if a power converter whose operation is to be started is selected, a power converter corresponding to a secondary battery having the greatest residual stored power level may be selected. In this manner, residual stored power levels of all the secondary batteries can be consumed uniformly.

Although the embodiments employ NAS batteries as the secondary batteries, other types of batteries may be employed.

It is to be noted that the present invention is not restricted to the foregoing embodiments, and constituent elements can be modified and changed into shapes without departing from the scope of the invention at an embodying stage. Additionally, various inventions can be formed by appropriately combining a plurality of constituent elements disclosed in the foregoing embodiments. For example, several constituent elements may be eliminated from all constituent elements disclosed in the embodiments. Furthermore, constituent elements in the different embodiments may be appropriately combined.

What is claimed is:

1. A secondary battery system comprising:
a plurality of secondary batteries;
a plurality of power converters, which are provided respectively corresponding to the plurality of secondary batteries, and which convert electric power supplied respectively from the corresponding one of the plurality of secondary batteries; and
a control apparatus which is configured to:
compare (i) a residual stored power level of one of the secondary batteries corresponding to one of the power converters which is operating with (ii) a residual stored power level of one of the secondary batteries corresponding to one of the power converters which is stopped;
detect when an inequality C %<A %×B % is satisfied, where A % is the residual stored power level of the secondary battery corresponding to the stopped power converter, B % is a setting value, and C % is the residual stored power level of the secondary battery corresponding to the operating power converter; and
when it is detected that the inequality is satisfied, stop operation of the operating power converter and start operation of the stopped power converter.

2. A control apparatus for a secondary battery system which comprises a plurality of secondary batteries and a plurality of power converters which are provided respectively corresponding to the plurality of secondary batteries, and which convert electric power supplied respectively from the corresponding one of the plurality of secondary batteries,
wherein the control apparatus is configured to:
compare (i) a residual stored power level of one of the secondary batteries corresponding to one of the power converters which is operating with (ii) a residual stored power level of one of the secondary batteries corresponding to one of the power converters which is stopped;

detect when an inequality C %<A %×B % is satisfied, where A % is the residual stored power level of the secondary battery corresponding to the stopped power converter, B % is a setting value, and C % is the residual stored power level of the secondary battery corresponding to the operating power converter; and when it is detected that the inequality is satisfied, stop operation of the operating power converter and start operation of the stopped power converter.

3. A control method for a secondary battery system which comprises a plurality of secondary batteries and a plurality of power converters which are provided respectively corresponding to the plurality of secondary batteries, and which convert electric power supplied respectively from the corresponding one of the plurality of secondary batteries, the control method comprising:

comparing (i) a residual stored power level of one of the secondary batteries corresponding to one of the power converters which is operating with (ii) a residual stored power level of one of the secondary batteries corresponding to one of the power converters which is stopped;

detecting when an inequality C %<A %×B % is satisfied, where A % is the residual stored power level of the secondary battery corresponding to the stopped power converter, B % is a setting value, and C % is the residual stored power level the secondary battery corresponding to the operating power converter; and when it is detected that the inequality is satisfied, stopping operation of the operating power converter and starting operation of the stopped power converter.

\* \* \* \* \*